Inventor
Calvin C. Williams
By Thos. H. Johnston
Attorney

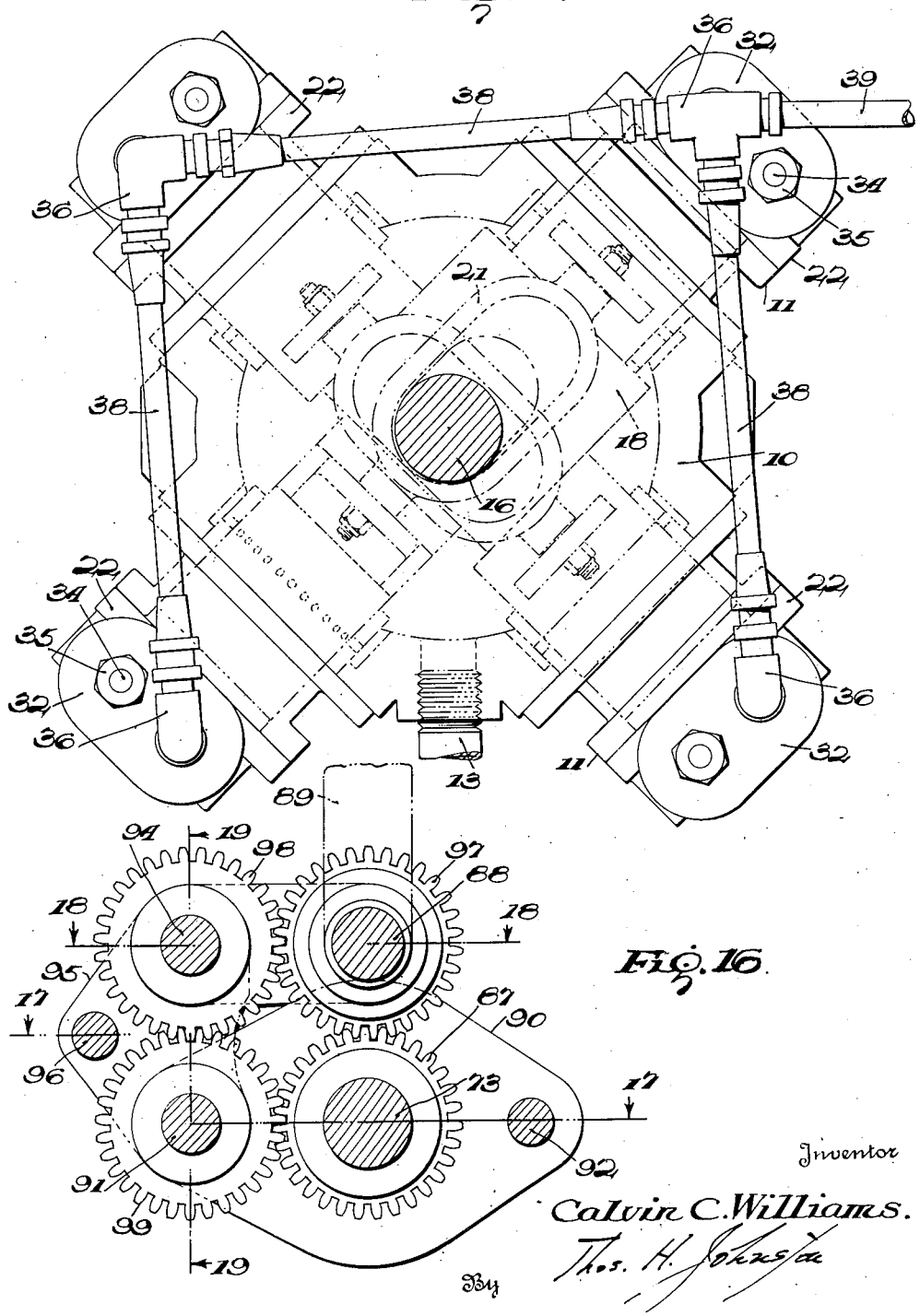

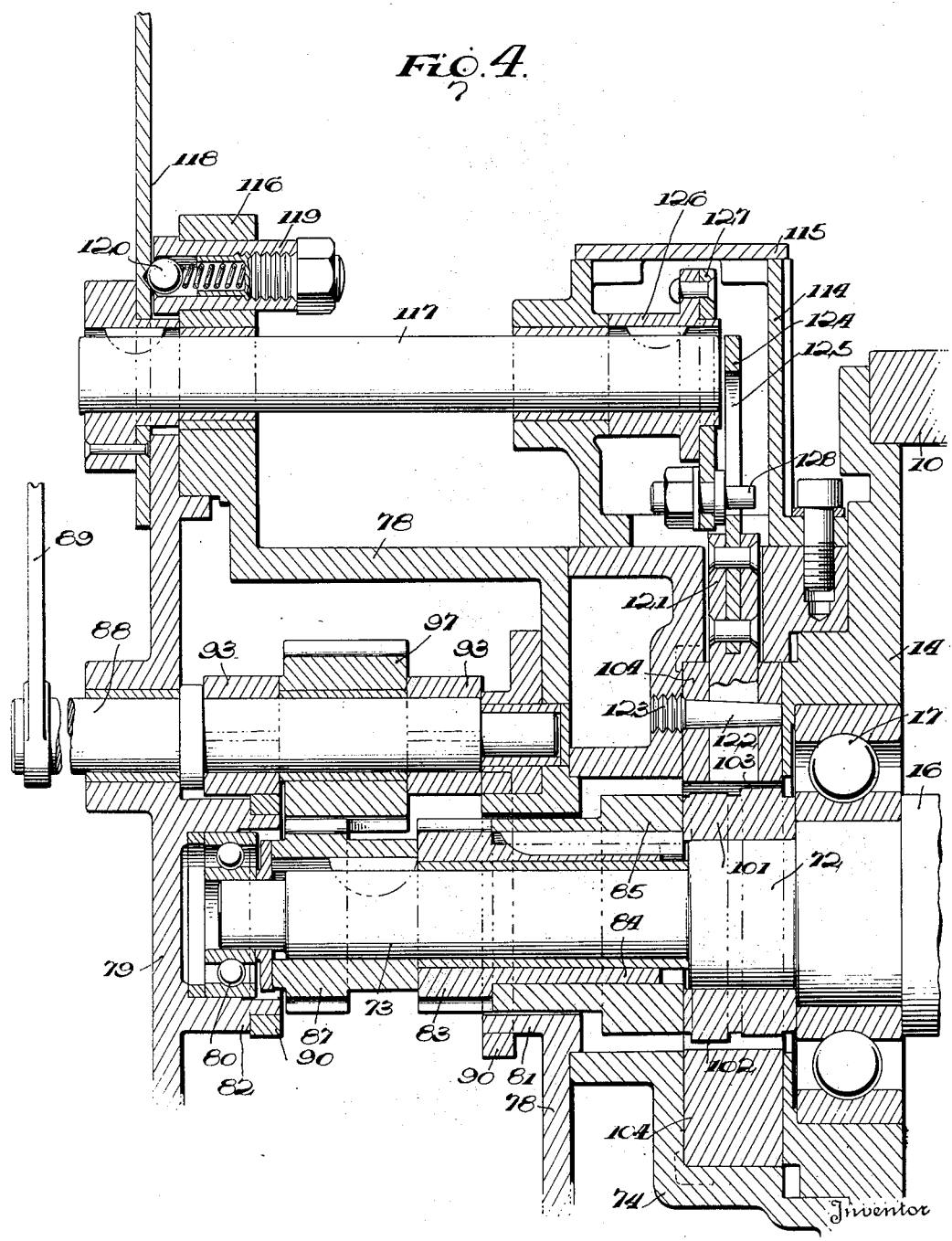

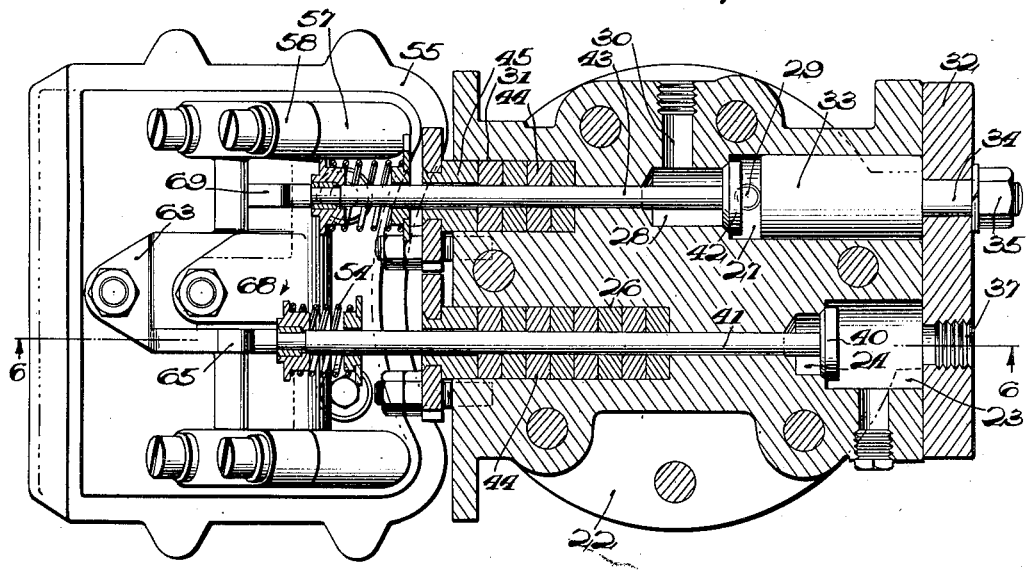
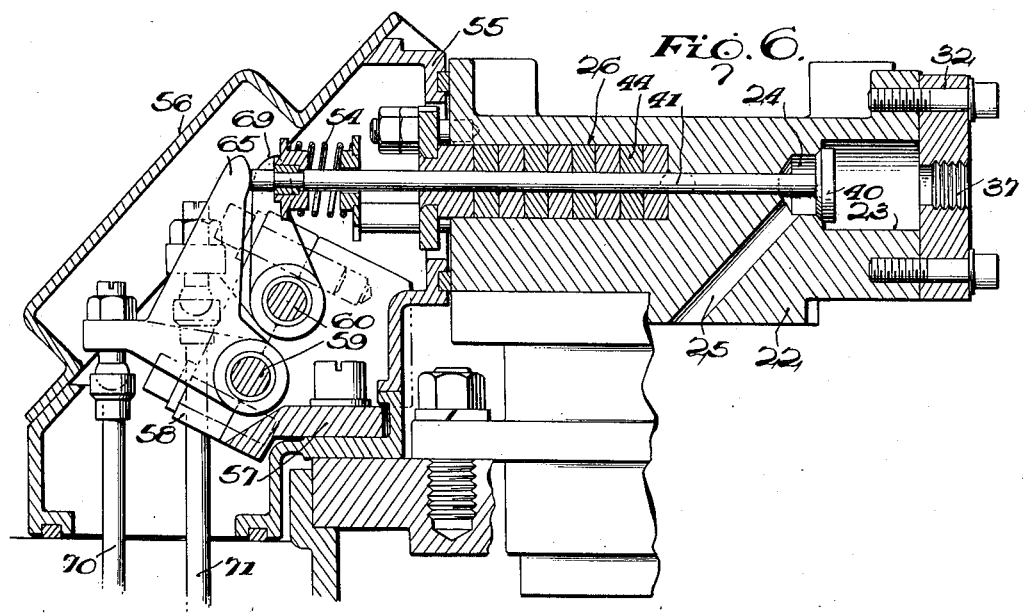

July 4, 1950  C. C. WILLIAMS  2,513,982
RADIAL STEAM ENGINE WITH WATER RELEASE MECHANISM
Filed Oct. 1, 1946  11 Sheets-Sheet 6
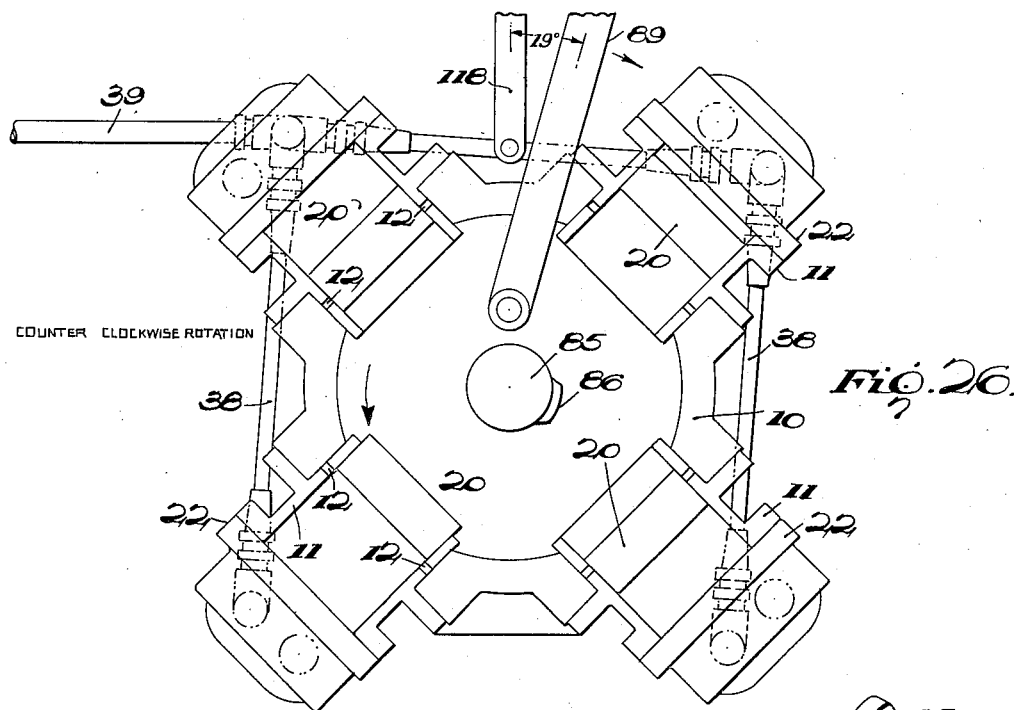
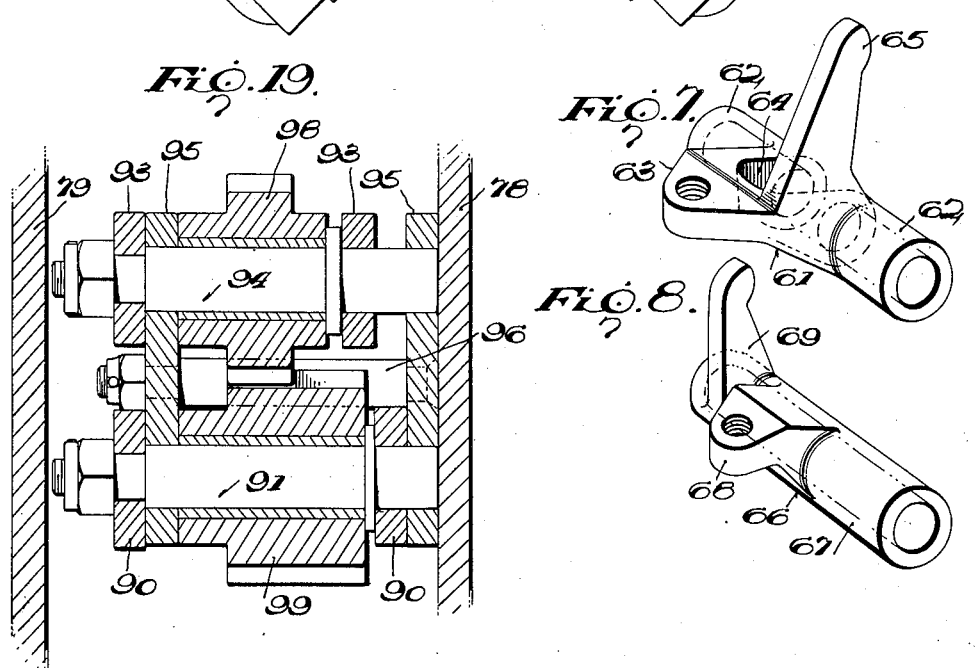
INVENTOR.
Calvin C. Williams
BY Thos. H. Johnston
Attorney July 4, 1950   C. C. WILLIAMS   2,513,982
RADIAL STEAM ENGINE WITH WATER RELEASE MECHANISM
Filed Oct. 1, 1946   11 Sheets-Sheet 7

INVENTOR.
Calvin C. Williams
BY
Attorney

INVENTOR.
BY Calvin C. Williams.
Thos. H. Johnston
Attorney

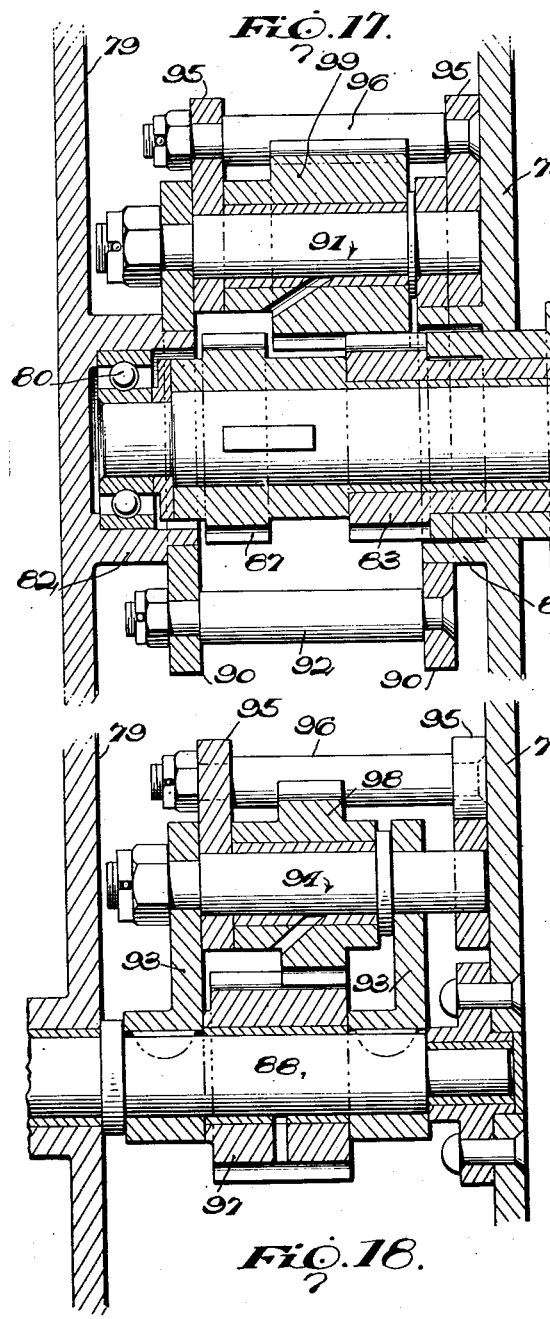

July 4, 1950
C. C. WILLIAMS
2,513,982
RADIAL STEAM ENGINE WITH WATER RELEASE MECHANISM
Filed Oct. 1, 1946
11 Sheets-Sheet 10
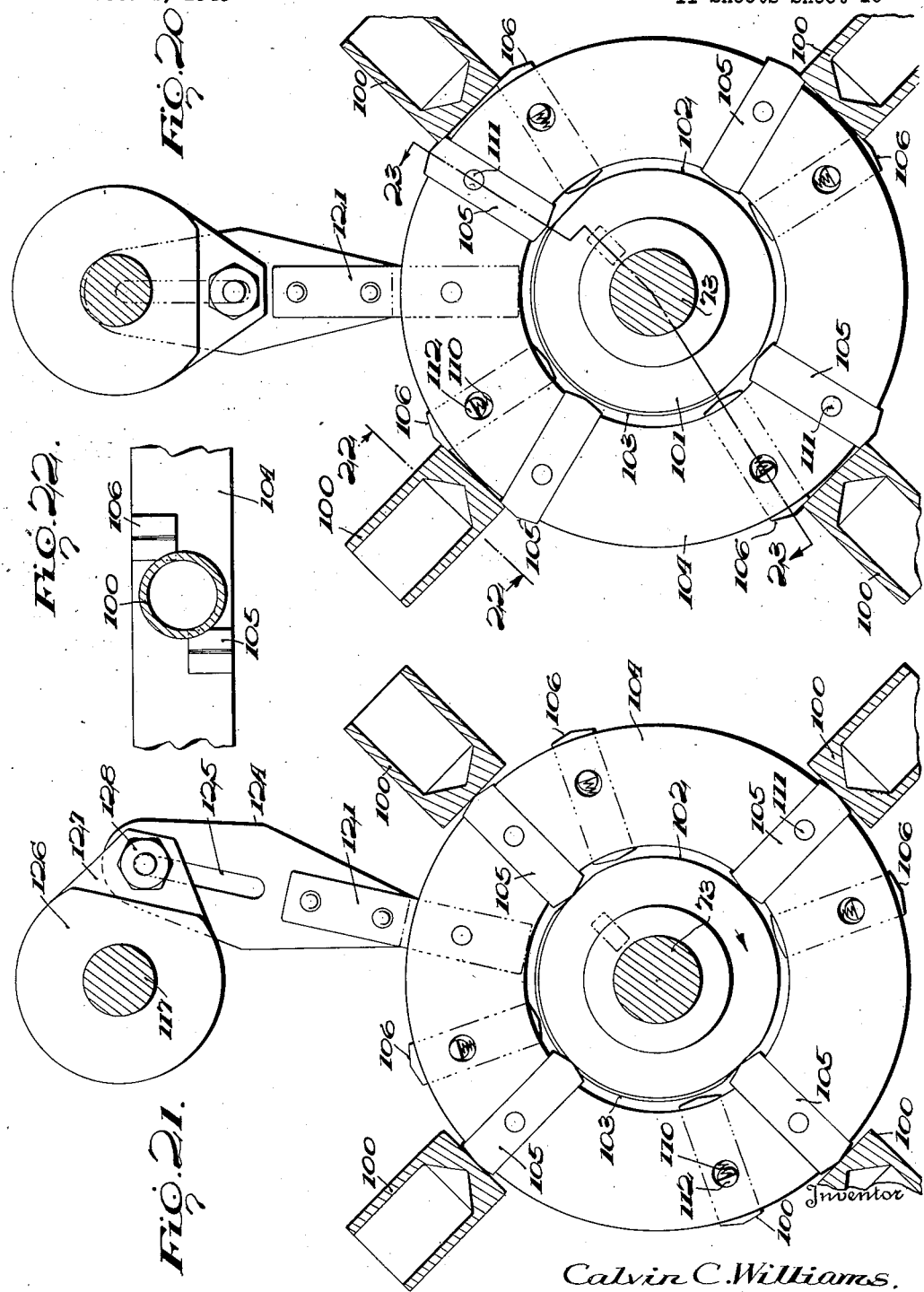
Inventor
Calvin C. Williams.
By Thos. H. Johnston
Attorney July 4, 1950  C. C. WILLIAMS  2,513,982
RADIAL STEAM ENGINE WITH WATER RELEASE MECHANISM
Filed Oct. 1, 1946  11 Sheets-Sheet 11

NEUTRAL.

CLOCKWISE ROTATION

INVENTOR.
Calvin C. Williams.
BY Thos. H. Bruster
Attorney

Patented July 4, 1950

2,513,982

UNITED STATES PATENT OFFICE 2,513,982

RADIAL STEAM ENGINE WITH WATER RELEASE MECHANISM

Calvin C. Williams, Philadelphia, Pa.

Application October 1, 1946, Serial No. 700,503

13 Claims. (Cl. 121—136)

This invention relates to an improved radial steam engine of the high speed type.

Heretofore, steam engines of this type have been heavy, in so far as I am aware, in proportion to the horse power available, and have lacked flexibility of control. Moreover, units of the type heretofore have been wasteful of feed steam, and have therefore not been economical, due, among other reasons, to cumbersome cut-off mechanism and consequently, a lack of ease and flexibility in the adjustment thereof. Furthermore, units of the kind heretofore have seemingly followed, more or less, the conceptions of stationary steam engines or even locomotives for inspiration regarding a reverse mechanism, with dismal practical results as to weight and flexibility of adjustment, while a water release for the engine cylinders has usually been embodied in a more or less crude mechanism involving pet cocks, as will be well understood.

The present invention, therefore, has as its objects to provide a radial steam engine which will be light in weight in proportion to the horse power developed, compact, so as to take up little space, wherein an efficient and flexibly adjustable cut-off mechanism will be provided, which mechanism may, at any time, be easily adjusted by hand so that the engine may be operated economically, wherein the cut-off mechanism will also provide means for reversing the engine, and may, if so desired, because of a cut-off range from near zero to the maximum lateness provided, further be employed as a throttle capable of causing the engine to stop, wherein a water release mechanism will be provided which, like the cut-off mechanism, may at any time be easily and quickly adjusted by hand, and wherein the actuation of the water release valves employed will be synchronized with the rotation of the crank shaft so that in addition to its function as a water release mechanism, said mechanism may at any time be manually rendered operative for relieving back pressure in the engine cylinders and thereby increasing the torque effort of the engine, thus to embody a unit peculiarly suitable for buses, trucks, motor boats or the like wherein flexibility of power, either forward or backward, is imperative.

The invention has other objects regarding certain structural features and arrangement of parts. However, in the foregoing, I have stated only the broad objectives of the invention, and although in some respects lesser objects are important still, for the sake of clarity, I have purposely not gone into detail, but will endeavor to clarify them during the following description of the invention. I therefore, do not wish to be limited in this respect.

In the drawings:

Figure 3 is a diagrammatic rear elevation.

Figure 4 is an enlarged vertical section on the line 4—4 of Figure 2.

Figure 5 is an enlarged horizontal section on the line 5—5 of Figure 1 and particularly showing the feed steam and water release valves and associated parts.

Figure 6 is a vertical section on the line 6—6 of Figure 5.

Figure 7 is a detail perspective view of the feed steam rocker.

Figure 8 is a detail perspective view of the water release rocker.

Figure 16 is a vertical section through the cut-off gear assembly on the line 16—16 of Figures 1 and 2.

Figure 17 is a horizontal section on the line 17—17 of Figure 16.

Figure 18 is a horizontal section on the line 18—18 of Figure 16.

Figure 19 is a vertical section on the line 19—19 of Figure 16.

Figure 20 is a detail elevation of the annular plunger support and showing said support in neutral position.

Figure 21 is a view similar to Figure 20 but showing the plunger support in forward position.

Figure 22 is a detail section on the line 22—22 of Figure 20.

Figure 23 is a section on the line 23—23 of Figure 20.

Figure 24:
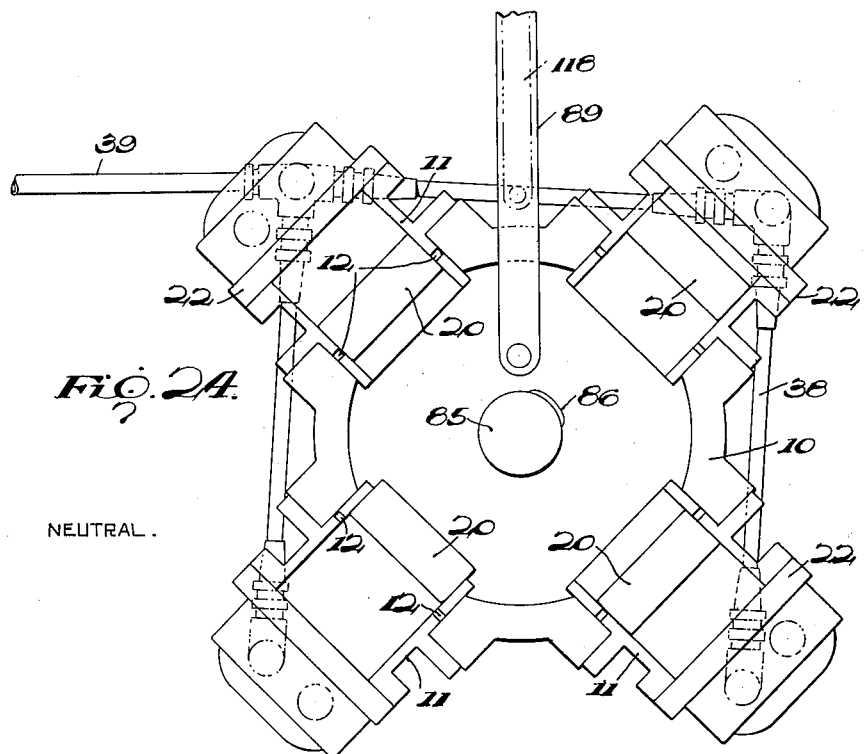
Figure 25:
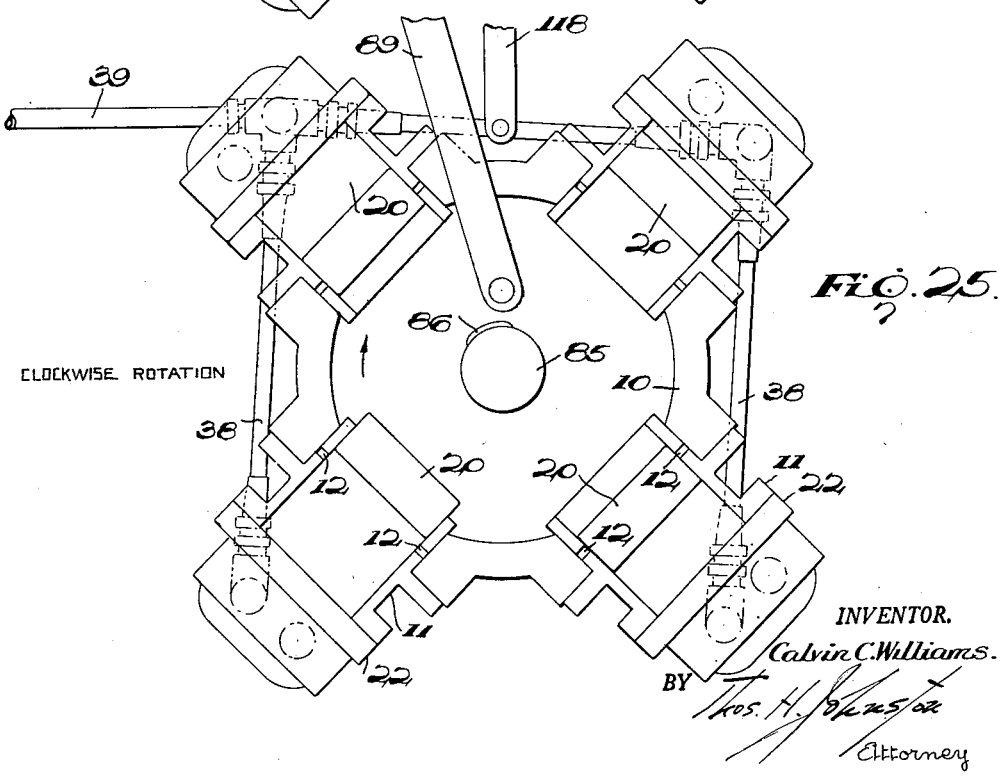

Figures 24, 25, and 26 are diagrammatic views.

The invention is shown as embodied in an engine of four radial cylinders, and will be so described. However, if so desired, the number of cylinders employed in practice may be varied to suit power out-put, or other factors.

Figure 1:
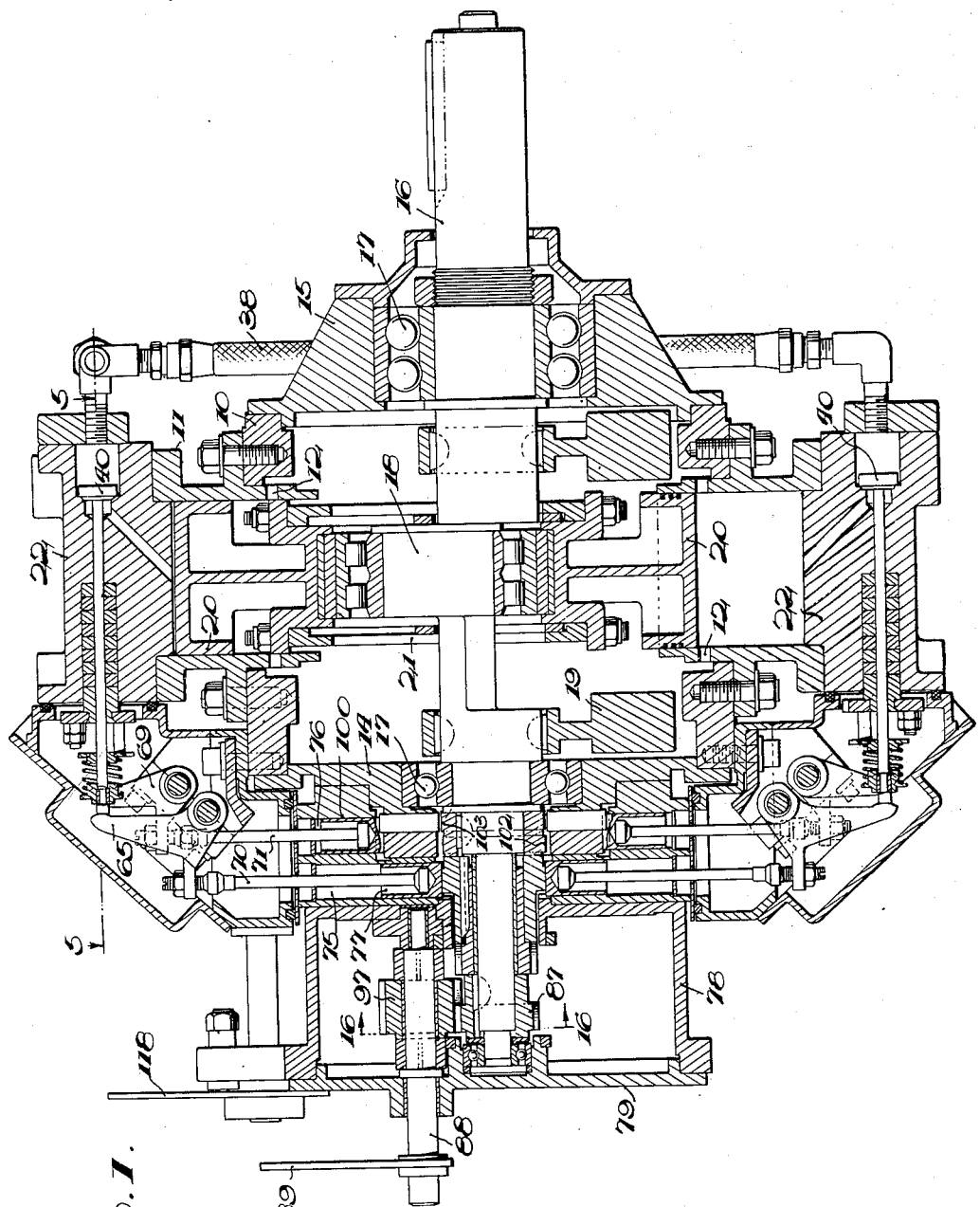
Figure 1 is a longitudinal sectional view through my improved engine.
Figure 2:
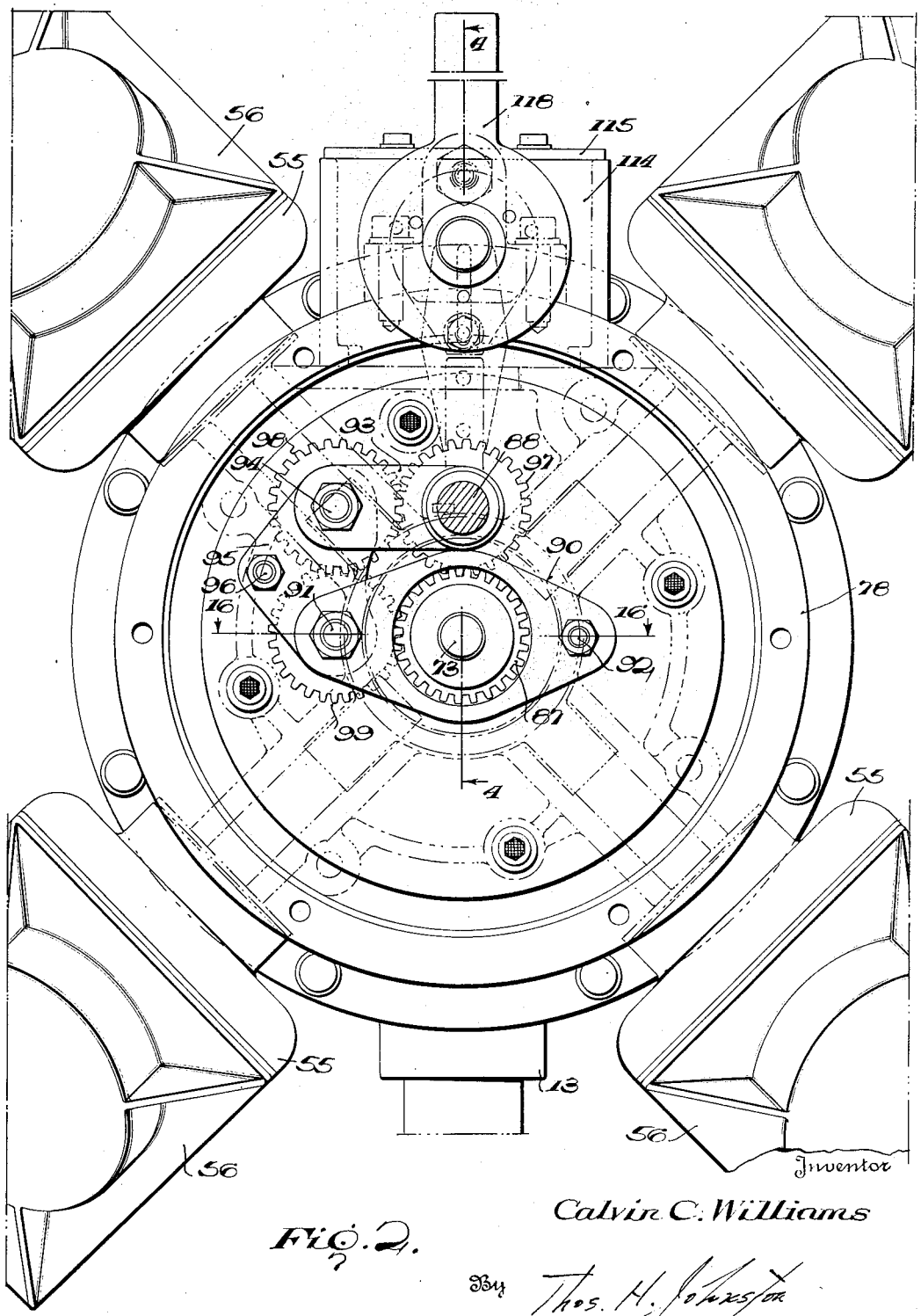
Figure 2 is a front elevation, the cover plate of the gear housing being removed.

In carrying the invention into effect, I employ, as perhaps best sent in Figures 1, 2 and 3 of the drawings, a cylindrical casing 10 through the periphery of which are fixed equidistantly spaced radial cylinders 11 each provided near its inner end with a series of circumferentially spaced exhaust openings 12 adapted to admit exhaust steam into the casing, and extending from the bottom of the casing is an exhaust outlet 13. At the forward end of the casing is an end plate 14, while at the rear end of the casing is an end plate 15, and journaled through said plates is a crank shaft 16 mounted by bearings 17.

The shaft 16 is provided with a crosshead 18 balanced by counterweights 19, and coacting with the crosshead are pistons 20 connected in pairs by links 21. All of this structure is similar to that shown in Patent No. 2,312,057 granted to me February 23, 1943, and operates in similar manner, thus rendering explanation herein unnecessary.

Closing the cylinders 11 at their outer ends are heads 22. The heads as well as the parts carried thereby are identical, and description in connection with a single head will therefore suffice for all.

In connection with the heads 22, reference is made particularly to Figures 3, 5, 6, 9, 10, 11 and 12 of the drawings. Formed in each of the heads from one side of the periphery thereof is a feed steam chamber 23, at the inner end of which is a pocket 24, and leading obliquely downward from said pocket is a passage 25 the lower end of which is disposed eccentrically of the head and thus eccentrically of the cylinder to which the head is attached. Feed steam entering through the passage into the cylinder will accordingly be caused to swirl within the cylinder and become more or less evenly distributed therein. Aligning with the chamber 23 and pocket 24 is a socket 26 formed in the head from the side thereof opposite said chamber.

Arranged parallel to the chamber 23 is a water outlet chamber 27 at the inner end of which is a pocket 28. Entering vertically through the head into said chamber is a passage 29, and leading from said pocket is a water outlet passage 30. Thus, water of condensation in the cylinder to which the head is attached may rise through the passage 29 and flow out through the passage 30. Aligning with the chamber 27 and pocket 28 is a socket 31.

Closing the chambers 23 and 27 at their outer ends is a cover plate 32, and filling the outer end portion of the chamber 27 close up to the outer end of the passage 29 is a plug 33 having a stem 34 on which is screwed a nut 35 securing the plug in position. Referring for the moment to all four cylinders of the engine, it will be seen that I provide, as shown in Figure 3, fittings 36 which are screwed into suitable passages 37 in the plates 32 to communicate with the chambers 23, and connecting said fittings with each other are pipes 38. Connected to one of said fittings is a supply pipe 39 communicating with a suitable source of feed steam and, if so desired, a conventional throttle, not shown, may be interposed in said pipe. Thus, as will be perceived, feed steam may be fed to the chambers 23 of all four of the cylinder heads 22 simultaneously.

Slidable upon each of the heads 22 to coact with a seat at the junction of the chamber 23 and pocket 24 is a steam valve 40 having a stem 41 extending axially of the socket 26. As will be seen, the valve is thus adapted to cut off flow of feed steam from the chamber 23 through the passage 25 to the cylinder to which the head is attached. Slidable upon the head to coact with a seat at the junction of the chamber 27 and pocket 28 is a water release valve 42 having a stem 43 extending axially of the socket 31. Thus, this valve is adapted to control the exhaust of water through the passages 29 and 30 as well as the relief of back pressure in the cylinder to which the head is attached.

Figure 12:
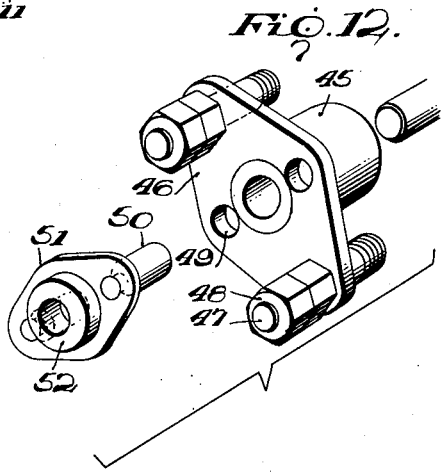
Figure 12 is a perspective view of parts of one of the glands.

Disposed in the sockets 26 and 31 to surround the valve stems 41 and 43 are suitable packing gland washers 44, and fitting the sockets are followers 45 each carried, as perhaps best seen in Figure 12, by a plate 46. Screwed into the head, a pair to each plate, are studs 47 which extend freely through the ends of the plates, and screwed on said studs are nuts 48 which may be adjusted for advancing the followers 45 and tightening the washers 44 about the valve stems.

Figure 9:
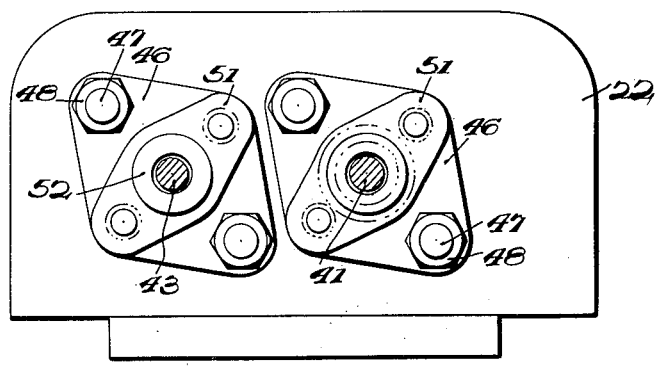
Figure 9 is a front elevation of a cylinder head.
Figure 10:
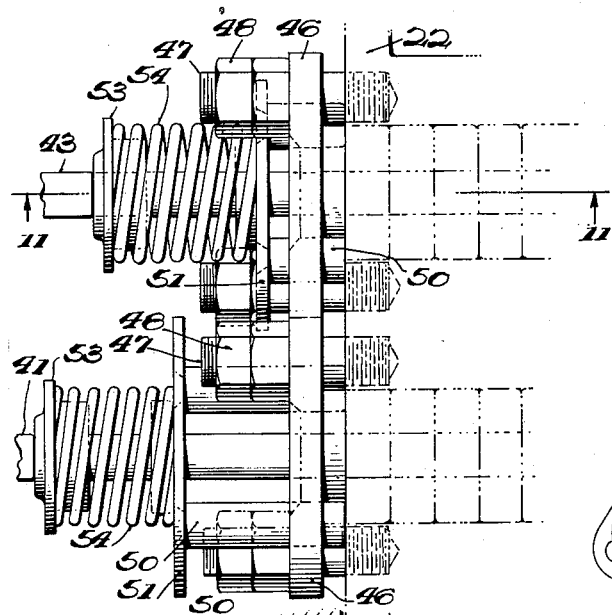
Figure 10 is a plan view of the packing glands for the feed steam and water release valves.
Figure 11:
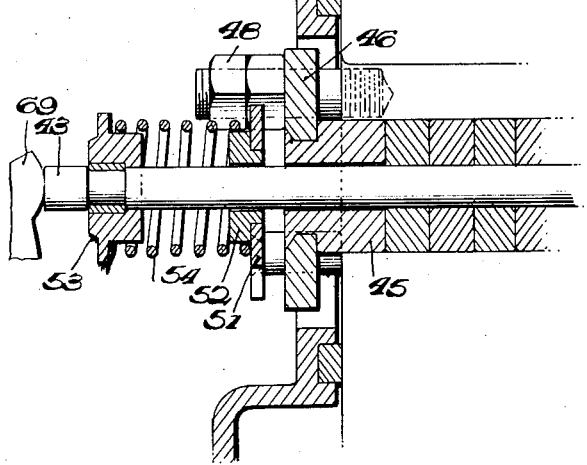
Figure 11 is a vertical section on the line 11—11 of Figure 10.
Figure 13:
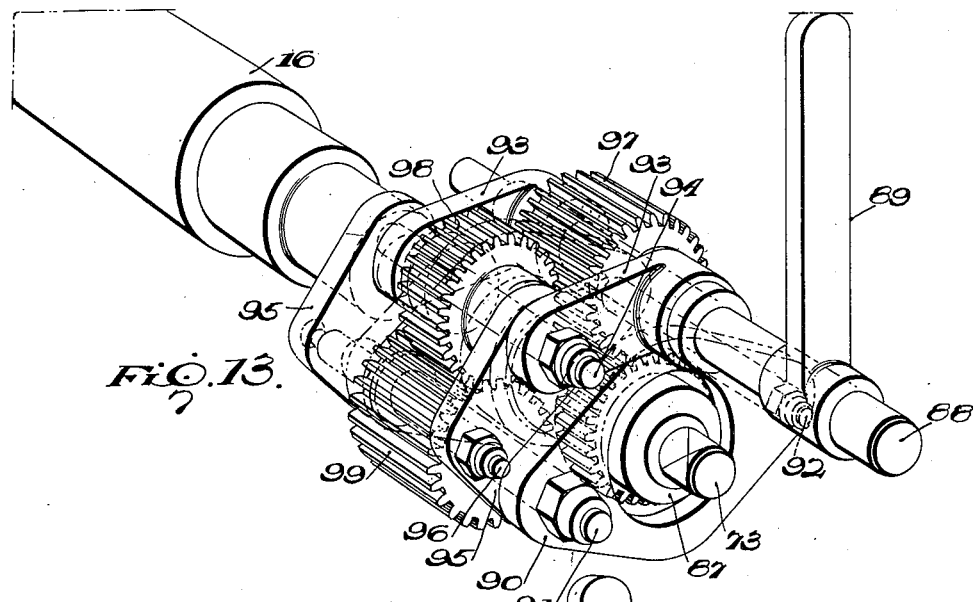
Figure 13 is a perspective view of the variable cut-off gear assembly.

Each of the plates 46 is provided with a pair of openings 49, and extending freely through said openings to abut the cylinder head are spacer pins 50 carried by a spring-rest plate 51 to which is fixed a collar 52. As seen in Figure 9, the plates 51 are disposed at substantially a right angle to the plates 46 while, as seen in Figure 11, the collars 52 freely receive the valve stems 41 and 43 therethrough. Removably fixed to the outer end portions of the valve stems are spring-rest collars 53, and extending between said collars and the plates 51 to fit at their inner ends about the collars 52 are valve springs 54 normally holding the valves 40 and 42 closed.

For the sake of clarity, I shall continue the description in connection with a single head 22 of the cylinders 11.

Fixed to the forward end of the casing 10 to house the outer ends of the valve stems 41 and 43 and associated parts carried by said head is, as particularly seen in Figures 2, 5 and 6, a shroud 55 closed by a removable cover plate 56, and bolted within the shroud is a bearing bracket 57 having a removable cap plate 58. Fixed between the bracket and plate are shafts 59 and 60 respectively. The shaft 59 carries a rocker 61 which, as seen in detail in Figure 7, is provided with aligned sleeves 62 fitting the shaft, and connecting said sleeves with each other is a rearwardly extending lug 63 providing a notch 64 between the inner ends of the sleeves. Rising from the rocker at one side of said notch is an arm 65, the free end of which is disposed to engage the outer end of the stem 41 of the steam valve 40.

Journaled upon the shaft 60 is a rocker 66 which, as seen in detail in Figure 8, is provided with a single sleeve 67 fitting the shaft, and extending from said sleeve is a lug 68 which projects over the notch 64 in the rocker 61. The purpose of the notch 64 in the rocker 61 thus becomes apparent, which purpose is to accommodate a push rod connected with the lug 68. Rising from the sleeve 67 of the rocker 66 is an arm 69, the free end of which is disposed to engage the outer end of the stem 43 of the water release valve 42. Cooperating with the lug 63 of the rocker 61 is a push rod 70, and cooperating with the lug 68 of the rocker 66 is a push rod 71 extending through the notch 64 of the rocker 61.

The rods are thus disposed in the same plane parallel to the planes of oscillation of the laterally spaced arms 65 and 69 of the rockers. As will be appreciated, the push rods are movable outwardly for actuating the rockers and opening the valves 40 and 42.

The variable cut-off mechanism employed will now be described. In this connection, reference is particularly made to Figures 1, 4, 13, 14, 15, 16, 17, 18, and 19 of the drawings.

Formed on the crank shaft 16 at its forward end is a hub 72, and extending from said hub axially of the shaft is a spindle 73. Fixed to the end plate 14 of the crank case 10 to surround said hub as well as the inner end portion of the spindle is a circular tappet guide 74 which, at the planes of the pairs of spaced push rods 70 and 71, is provided with pairs of correspondingly spaced cylinders, one cylinder of each pair being indicated at 75 and the other cylinder of each pair being indicated at 76, the latter cylinder being shorter. Thus, there are four of the cylinders 75, and a like number of the cylinders 76. Slidable in the cylinders 75 are tappets 77 which receive the inner ends of the push rods 70.

Fixed to the tappet guide 74 at its forward end is a cylindrical gear housing 78 closed by a removable cover plate 79. As perhaps best seen in Figure 4, this plate carries a bearing 80 which journals the free end of the spindle 73. Formed on the rear wall of the housing 78 to surround the spindle 73 in concentric relation thereto is an annular flange 81, and aligning with said flange, but of smaller diameter, is an annular flange 82 on the cover plate 79, which latter flange mounts the bearing 80.

Associated with the spindle 73 are five gears now to be described for advancing or retarding the cut-off. Freely rotatable on the spindle is a gear 83 having an elongated hub 84 to which is keyed a cam 85 having, as seen in Figure 24, for instance, a lobe 86 disposed to successively engage the tappets 77 and open the steam valves 40, as will be well understood. Keyed to the outer end portion of the spindle 73 is a drive gear 87.

Figure 14:
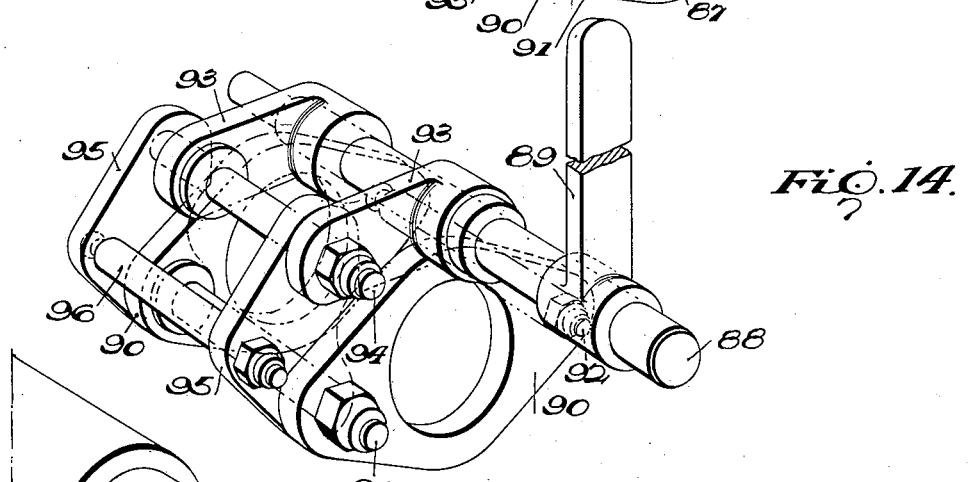
Figure 14 is a perspective view of the cradle for certain of the variable cut-off gears.
Figure 15:
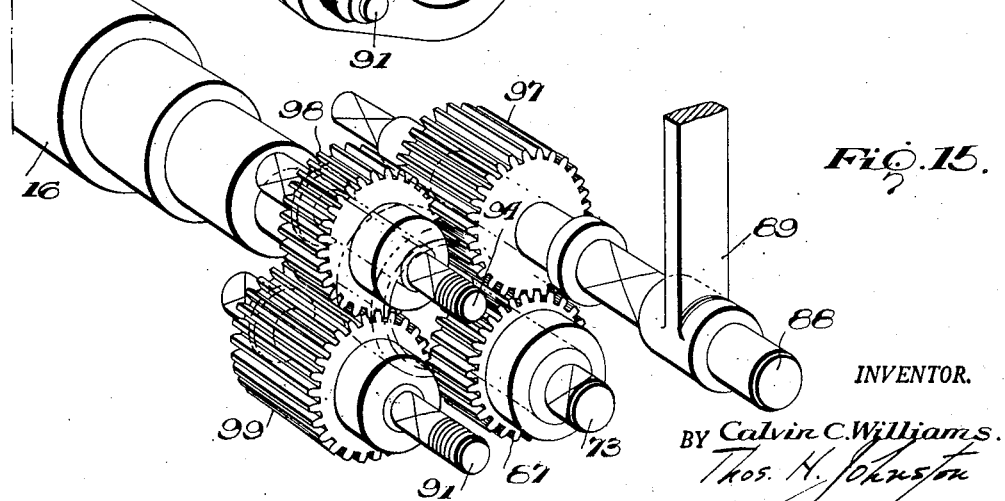
Figure 15 is a perspective view of the variable cut-off gears with the cradle omitted.

Two of the gears not yet described of the five mentioned above are mounted to adjustably swing about the gears 83 and 87, and for this purpose a cradle, as seen in Figure 14, is provided.

Journaled upon the gear housing 78 and cover plate 79 above the spindle 73 is a parallel hand shaft 88 to the outer end of which is fixed a handle 89, and rotatably mounted upon the flanges 81 and 82 of said housing and cover plate are end plates 90 connected with each other at corresponding ends thereof by a cross shaft 91 and at their opposite corresponding ends by a bolt 92 so that said end plates will rock in unison. Fixed to the hand shaft 88 are cranks 93, and mounted upon the free ends of said cranks is a cross shaft 94. Extending between the shafts 91 and 94 are links 95 connected with each other by a cross bolt 96. Thus, as will be appreciated, as the handle 89 is swung either to right or left, the cradle will be correspondingly rocked about the spindle 73 as a center.

Freely mounted upon the hand shaft 88 between the cranks 93 is a gear 97 meshing with the gear 87. Freely mounted upon the shaft 94 is a gear 98 meshing with the gear 97, and freely mounted upon the shaft 91 is a gear 99 meshing with the gear 98 and with the gear 83. Of the five cut-off gears 83, 87, 97, 98, and 99 mentioned above, the two gears 98 and 99 are thus mounted to swing, the gear 98 being adapted to roll around the gear 97 and the gear 99 being adapted to roll around the gear 83 as the handle 89 is rocked.

It is now to be noted that while the engine is in operation and the crank shaft 16 is turning clockwise, for instance, the gear 87 will turn the gear 97 counter-clockwise, which latter, in turn, will rotate the gear 98 clockwise. The gear 98 will thus rotate the gear 99 counter-clockwise, which latter, in turn, will rotate the gear 83 clockwise. The cam 85 will thus be rotated clockwise in time with the crank shaft so that the lobe 86 of the cam will be caused to coact with the tappets 77 for successively opening the steam valves 40 as the pistons 20 are reciprocated.

Reference is now made to the diagrams of Figures 24, 25, and 26 of the drawings, and it will be assumed that it is desired to vary the cut-off while the crank shaft 16 is turning clockwise. To accomplish this purpose, the handle 89 is swung from neutral upright position, as shown in Figure 24, toward the left, as seen in Figure 25. As the handle is so swung, the gear 98 will be caused to roll downwardly around the gear 97 while the gear 99 will be caused to roll downwardly around the gear 83. Thus, even though the gear 98 is being rotated by the gear 97, which latter, in turn, is being rotated by the gear 87, as previously described, while the gear 83 is also being rotated by the gear 99, rolling of the gear 98 downwardly around the gear 97 will impart a turning movement to the gear 98 independently of its rotation by the gears 87 and 97. As will be perceived, an independent counter-clockwise rotation will be imparted to the gear 98, with the result that the gear 99 will be positioned clockwise and the gear 83 counter-clockwise. Counter-clockwise movement of the gear 83 will, of course, result in a like movement of the cam 85, so that by adjusting the handle 89, as specified, the lobe 86 of the cam may be shifted from the position shown in Figure 24 to the position shown in Figure 25 to vary the cut-off as desired within the range provided.

To reverse the engine, the handle 89 is swung from neutral upright position, as seen in Figure 24, to the right, as seen in Figure 26. As the handle is so swung, an independent clockwise rotation will be imparted to the gear 98, with the result that the gear 99 will be turned counter-clockwise and the gear 83 clockwise. The cam 85 will thus be rotatably adjusted to shift the lobe 86 of the cam from the position shown in Figure 24 to the position shown in Figure 26, not only to reverse the direction of rotation of the crank shaft 16 but also to vary the cut-off as desired within the range provided when the engine is operating in reverse.

Attention is now directed to the fact that when the handle 89 is disposed in neutral upright position, as shown in Figure 24, the cut-off will be so early as to admit nearly as much feed steam to any one cylinder at one side of top dead center of the piston in said cylinder, as at the other side of top dead center of said piston. Under such setting of the handle, the engine will therefore be caused to stop. Thus, the variable cut-off mechanism may be used as a throttle, although, as previously stated, a separate conventional throttle may be employed, if so desired.

The water release mechanism remains to be described, and in this connection reference is particularly made to Figures 1, 3, 4, 20, 21, 22, and 23 of the drawings.

Slidable in the cylinders 76 of the tappet guide 74, as seen in Figure 1, are tappets 100 flat at their inner ends and receiving the inner ends of the push rods 71, which latter are adapted to open the water release valves 42, as previously described. Fixed to the hub 72 of the crank shaft 16 is a cam 101 having a front lobe 102 and a rear lobe 103. As shown in Figures 20 and 21, the lobe 102 extends nearly throughout one-half of the periphery of the cam while the lobe 103 extends nearly throughout the other half of said periphery.

Rotatably mounted by the tappet guide 74 to surround the cam 101 is an annular plunger support 104, and slidable radially in suitable slots in the front face of said support is a series of four equidistantly spaced front plungers 105. Slidable radially in like slots in the rear face of the support is a series of four equidistantly spaced rear plungers 106 like the plungers 105. As will be observed, the plungers of the two series are arranged more or less close together to form pairs and are beveled at their ends. Further, as will be noted, the front plungers 105 are disposed to coact at their inner ends with the lobe 102 of the cam 101 while the rear plungers 106 are disposed to coact at their inner ends with the lobe 103 of the cam. However, as shown in Figure 22, both series of plungers are adapted to coact at their outer ends with the tappets 100.

Formed in the support 104 opposite the plungers 105 and 106 are lateral openings 107 at a right angle to which are radial sockets 108 opposite the mouth of each of which is an aligned opening 109 extending through the outer periphery of the support. Installed in the sockets 108 through the openings 109 are springs 110, and fixed through the plungers 105 and 106 are pins 111 cut away at their inner end portions to provide semi-cylindrical lugs 112 freely received within the openings 107. These lugs are thus provided with flat inner faces engaged by the springs 110 and curved outer faces to coact with the walls of the openings 107 for limiting the plungers in their outward radial movement under the influence of said springs, so that rattling of the plungers will be prevented while, at the same time, the inner ends of the plungers will normally be maintained slightly away from the lobes 102 and 103 of the cam 101. However, it is to be noted that those of the springs 54 which serve to normally hold the valves 42 closed are much stronger than the springs 110 so that any of the plungers not engaged at any time by the lobes of the cam will be depressed.

Mounted upon the tappet guide 74 at its upper side, as seen in Figure 4, is a lever box 114 closed by a removable cover plate 115, and rising from the gear housing 78 opposite said box is an ear 116. Journaled through the front wall of the box and said ear is a hand shaft 117 to the outer end of which is fixed a handle 118. Fixed through the ear 116 is a sleeve 119, and mounted by said sleeve is a spring-pressed ball detent 120 disposed to coact with the hub of the handle 118 for yieldably locking the handle in neutral upright position, or when swung to either right or left.

Fitting in a socket in the plunger support 104, as seen in Figure 4, is a radial lever 121 secured by a pin 122 and, as will be observed, a plug 123 is provided in the wall of the tappet guide 74 opposite said pin so that the pin may be removed. Fixed to the lever 121 is a lever plate 124, and formed in said plate is a slot 125. Fixed to the inner end of the hand shaft 117 within the box 114 is a head 126 to which is secured a plate 127, and fixed to said plate is a pin 128, the free inner end of which extends through the slot 125 in the lever plate 124 to coact with said lever plate. Thus, as will be perceived, the handle 118 may be swung for rocking the lever 121 and rotatably setting the plunger support 104 either to the right or left.

In Figure 20 of the drawings, I have shown the plunger support 104 in neutral position. In this position of said support, the handle 118 will stand upright, and one of the plungers 105 and one of the plungers 106, or a pair of said plungers, will be disposed, as shown in Figure 22, at opposite sides of each of the tappets 100 respectively. As will be observed, when the plunger support is so set, only the inner adjacent corners of the outer ends of any pair of plungers will be disposed beneath any of the tappets, and since the outer ends of the plungers are beveled, the lift of the lobes 102 and 103 of the cam 101 will not be sufficient to unseat the water release valves 42.

Assuming now that it is desired to open the water release valves while the crank shaft 16 is turning clockwise, for instance, the handle 118 is swung to the left, when the plunger support 104 will be rotated clockwise and set in the position shown in Figure 21 of the drawings. As will be noted, when the plunger support is so set, the series of plungers 105 will be shifted into alignment with the tappets 100 so that the ridges between the beveled faces at the outer ends of said plungers will be disposed to coact with the inner ends of the tappets. Thus, as the lobe 102 of the cam 101 is revolved beneath the inner ends of the plungers, the water release valves will be opened, when water may escape from the cylinders 11 through the passages 29 and 30 of the cylinder heads 22.

If the crank shaft 16 is turning counter-clockwise and it is desired to open the water release valves 42, the handle 118 is swung to the right. The plunger support 104 will thus be rotatably set in a position opposite to that shown in Figure 21, when the series of plungers 106 will be aligned with the tappets 100. Accordingly, as the lobe 103 of the cam 101 is revolved beneath the inner ends of said plungers, the water release valves will be opened.

As will be appreciated from the foregoing, the plunger support 104 has three positions, namely, one for neutral, one to accommodate clockwise rotation of the crank shaft 16, or forward position, and one to accommodate counter-clockwise rotation of said shaft, or reverse position. In each of said three positions, the plunger support will be yieldably locked set by the ball detent 120 acting on the handle 118.

As will be appreciated, the water release valves 42 are usually opened when the engine is first started and the parts are cold to result in the presence of water of condensation in the engine cylinders. However, in the present engine, an added function of the water release mechanism is to be noted.

A distinctive feature of the construction lies in the fact that the opening and closing of the water release valves 42 is synchronized with the rotation of the crank shaft 16 and, therefore, also with the movement of the pistons 20.

Explanation may be rendered more clear by using a pair of diametrically disposed cylinders and pistons as an example applicable to all in rotative turn. I shall accordingly, for this purpose, refer to a top cylinder and piston, and to a bottom cylinder and piston, say as seen in Figure 24. As the operation now to be described will be the same regardless of whether the crank shaft 16 is turning clockwise or counter-clockwise, no distinction in this respect need be made.

It will now be assumed that the engine is in operation and that the handle 118 is swung to render the water release mechanism operative. Therefore, when feed steam is being fed to the top cylinder and the piston of the bottom cylinder is moving outwardly, as will be understood from the foregoing description, the water release valve 42 of the bottom cylinder will be opened to relieve back pressure in the latter cylinder. Likewise, when feed steam is being fed to the bottom cylinder and the piston of the top cylinder is moving outwardly, the water release valve 42 of the top cylinder will be opened to relieve back pressure. Further, in both instances, the water release valve of either the top or bottom cylinder will be permitted to close before feed steam is next fed to either cylinder.

Thus, under the instance taken, when the engine is hot and even though no water of condensation is present in the engine cylinders, the water release mechanism may be rendered operative by rocking the handle 118 either to right or left, as conditions may demand, to relieve back pressure in the cylinders and so boost the torque effort of the engine in emergency.

Having thus described my invention, I claim:

1. A steam engine including a cylinder, a steam valve therefor, a crank shaft having a spindle, a cam for opening said valve and admitting feed steam to said cylinder, a gear free on the spindle and carrying said cam, a drive gear fixed to the spindle, an intermediate gear meshing with the drive gear, coacting gears meshing with each other as well as one with the intermediate gear and the other with said free gear, said intermediate and coacting gears forming a driving connection between the drive gear and said free gear for driving the latter gear and rotating said cam, means swingingly mounting said coacting gears and adustably movable for rolling said coacting gears about the intermediate and free gears respectively and rotatably setting said free gear and cam to vary the timing of the actuation of said valve, and means for adjustably swinging said first mentioned means.

2. A steam engine including a cylinder, a steam valve therefor, a crank shaft having a spindle, a gear free on said spindle, a cam carried by said gear for opening said valve and admitting feed steam to said cylinder, a drive gear fixed to the spindle, a cradle, a free gear carried by the cradle and meshing with said drive gear, other gears swingingly mounted by the cradle to mesh with each other as well as one with said free cradle-gear and the other with said cam-carrying gear for rotating the latter gear and revolving said cam under the impetus of said drive gear, the cradle being swingingly adjustable for rolling said swinging gears around said free cradle-gear and said cam-carrying gear for rotatably adjusting said cam-carrying gear and setting said cam to vary the timing of the actuation of said valve and advance or retard the cut-off of feed steam thereby, and means for rocking said cradle.

3. A steam engine including a cylinder, a steam valve therefor, a crank shaft, a gear housing enclosing a portion of said shaft, a cam for opening said valve and admitting feed steam to said cylinder, a gear free on said portion of the shaft and mounting said cam, a drive gear fixed to said portion of the shaft, an intermediate gear meshing with the drive gear, coacting gears meshing with each other as well as one with said intermediate gear and the other with said free gear, said intermediate and coacting gears forming a driving connection between the drive gear and said free gear for driving the latter gear and rotating said cam, a pivotally adjustable cradle mounted to rock upon said housing and journaling said coacting gears, said cradle being movable to roll said coacting gears about said intermediate and free gears respectively and rotatably setting said free gear and cam to vary the timing of the actuation of said valve, and means for adjusting said cradle.

4. A steam engine including a cylinder, a water release valve therefor, a crank shaft, means operable by the crank shaft for intermittently opening said valve in time with the rotation of said shaft, and manually controlled means operatively connected with said first mentioned means and adjustable for rendering said first mentioned means operative or inoperative selectively.

5. A steam engine including a cylinder, a water release valve therefor, a crank shaft, a cam driven by the crank shaft, a rotatably adjustable plunger support mounted adjacent to said cam, and a plunger carried by said support and movable by the cam to open said valve, said support being movable to one position rendering said plunger active and to another position rendering said plunger inactive.

6. A steam engine including a cylinder, a water release valve therefor, a crank shaft, a cam driven by the crank shaft, means including a tappet operable to open said valve, a rotatably adjustable plunger support mounted between said tappet and cam, and a plunger carried by said support and movable by the cam to actuate said tappet, said support being adjustable to dispose the plunger in active position in alignment with the tappet and to dispose the plunger in inactive position out of alignment with said tappet.

7. A steam engine including a cylinder, a water release valve therefor, a crank shaft, means for reversing the direction of rotation of said shaft, companion means one operable by the crank shaft for intermittently opening said valve in time with clockwise rotation of said shaft and the other operable by the crank shaft for intermittently opening said valve in time with counter-clockwise rotation of said shaft, and means adjustable for rendering one of said companion means active and rendering the other of said companion means inactive and vice versa.

8. A steam engine including a casing, a cylinder carried by the casing and provided with a water release valve, a crank shaft journaled on the casing and provided with a cam, a tappet guide carried by the casing, a tappet slidably mounted by said guide, means operable by the tappet for opening said valve, a rotatably adjustable plunger support mounted by said guide between said tappet and cam, and a plunger slidable upon said support and operable by said cam to actuate the tappet and open said valve, said support being movable to dispose the plunger in active position in alignment with said tappet and to dispose the plunger in inactive position out of alignment with said tappet.

9. A steam engine including a casing, a cylinder carried by the casing and provided with a water release valve, a crank shaft journaled on the casing and provided with a cam, a tappet guide carried by the casing, a tappet slidably mounted by said guide, means operable by the tappet for opening said valve, a rotatably adjustable plunger support mounted by said guide between said tappet and cam, a plunger slidable upon said support and operable by said cam to actuate the tappet and open said valve, said support being movable to dispose the plunger in active position in alignment with said tappet and to dispose the plunger in inactive position out of alignment with said tappet, a lever carried by said support, a hand shaft, means mounting said hand shaft, an operative connection between said hand shaft and lever, and a handle carried by the hand shaft for rocking the hand shaft and adjusting said plunger support.

10. A steam engine including a cylinder, a water release valve therefor, a crank shaft having a cam, means including a tappet operable to open said valve, a rotatably adjustable plunger support mounted between said tappet and cam, means for reversing the direction of rotation of the crank shaft, a pair of plungers slidable upon said support and selectively operable by said cam to act on said tappet and open said valve, yieldable means normally holding each of said tappets away from a portion of said cam, and means for adjusting said support to dispose one of said plungers in active position in alignment with said tappet when the crank shaft is turning clockwise and to dispose the other of said plungers in active position in alignment with said tappet when the crank shaft is turning counter-clockwise.

11. A steam engine including a cylinder, a steam valve therefor, a water release valve therefor, variable cut-off mechanism actuated by said shaft for opening the steam valve and admitting feed steam to said cylinder, said mechanism being adjustable for reversing the direction of rotation of said shaft, water release mechanism operable by said shaft and adjustable for intermittently opening said water release valve in time with the rotation of said shaft when turning clockwise as well as in time with the rotation of said shaft when turning counter-clockwise, and manually controlled means operatively connected with said water release mechanism and adjustable for rendering said water release mechanism operative or inoperative selectively.

12. In a steam engine, a cylinder, a head therefor, laterally spaced steam and water release valves carried by said head, superposed rockers carried by the head and provided with laterally spaced arms movable to engage and open said valves, lugs carried by said rockers and disposed one above the other in the same plane, and means for actuating said rockers including push rods operatively coacting with said lugs and disposed in the same plane at substantially a right angle to the planes of oscillation of said arms.

13. In a steam engine, a cylinder, a head therefor having a socket, a valve carried by said head and provided with a stem extending through said socket, packing material disposed in said socket about the stem, studs projecting from the head, a follower plate slidably fitting over said studs and provided with a follower fitting in said socket to coact with said packing material, means adjustable upon said studs to coact with the plate for advancing said follower within the socket and tightening said material about the valve stem, a spring-rest plate freely receiving the valve stem therethrough and provided with spacer pins extending freely through said follower plate to abut the cylinder head, a collar carried by the valve stem, and a spring disposed between said collar and spring-rest plate and normally holding the valve closed.

CALVIN C. WILLIAMS.

REFERENCES CITED

The following references are of record in the file of this patent:

UNITED STATES PATENTS

| Number | Name | Date |
|---|---|---|
| 267,534 | Hunter | Nov. 14, 1882 |
| 313,007 | Lynn | Feb. 24, 1885 |
| 746,626 | Dieter | Dec. 8, 1903 |
| 751,924 | Kelly | Feb. 9, 1904 |
| 1,927,525 | Mueller | Sept. 19, 1933 |